March 1, 1932.  H. C. KOCH  1,847,767
APPARATUS FOR MAKING PREPARED ROOFING
Filed Dec. 31, 1926  2 Sheets-Sheet 1
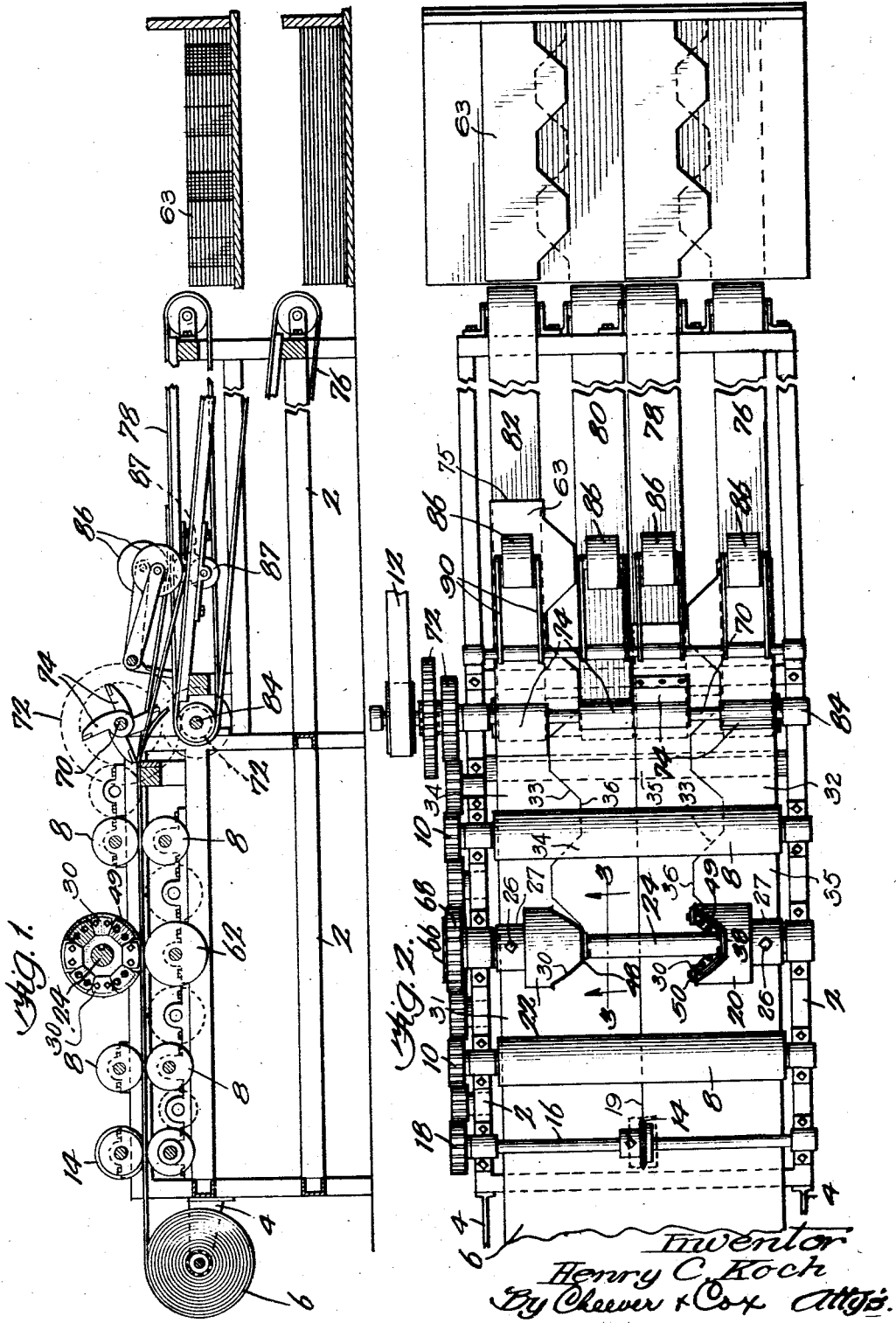
Inventor
Henry C. Koch
By Cheever & Cox Attys.

March 1, 1932. H. C. KOCH 1,847,767
APPARATUS FOR MAKING PREPARED ROOFING
Filed Dec. 31, 1926  2 Sheets-Sheet 2
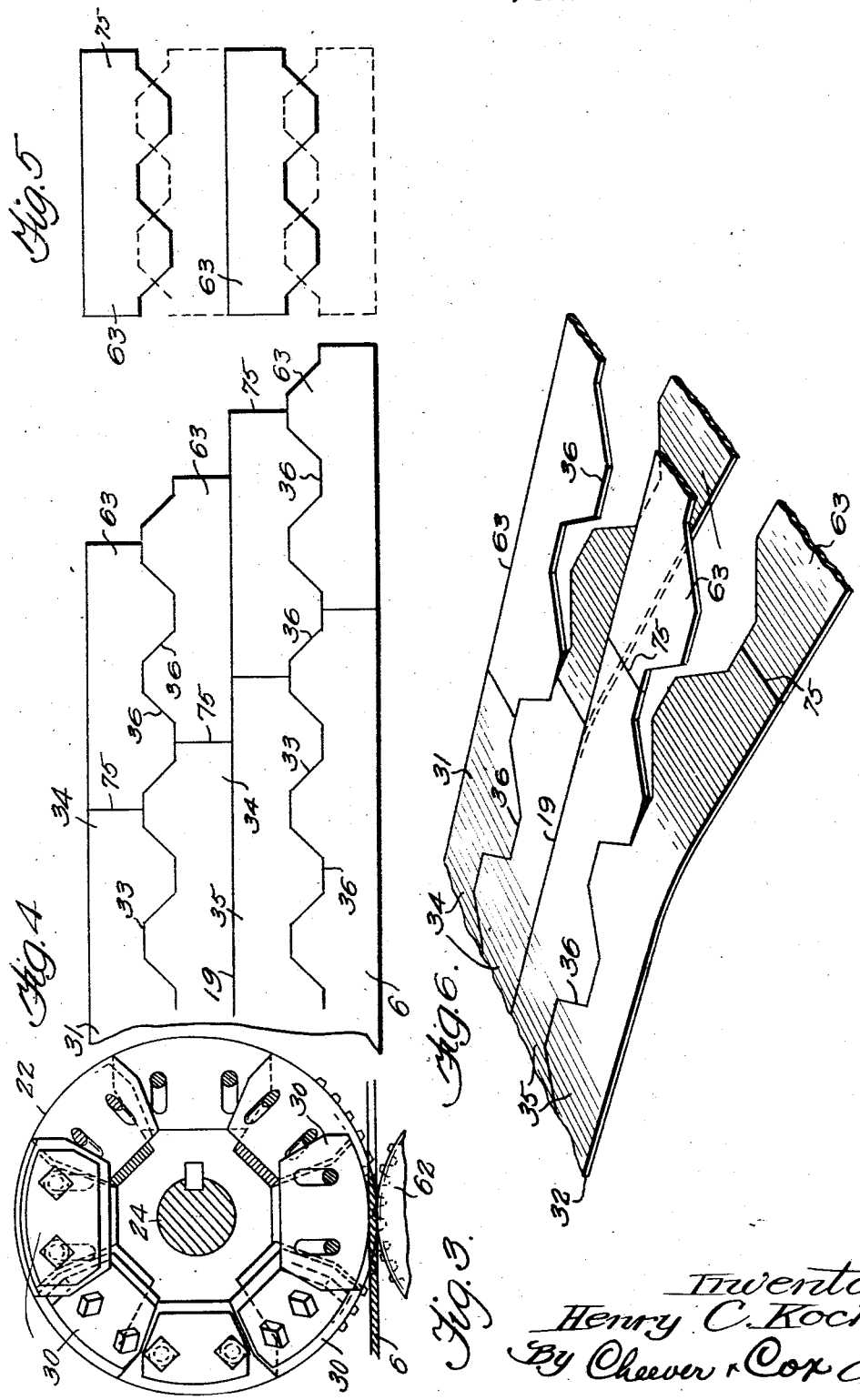

Patented Mar. 1, 1932

1,847,767

UNITED STATES PATENT OFFICE

HENRY C. KOCH, OF CHICAGO, ILLINOIS

APPARATUS FOR MAKING PREPARED ROOFING

Application filed December 31, 1926. Serial No. 158,354.

This invention relates in general to an apparatus for making prepared roofing, and particularly to an apparatus for forming shingles from strips of prepared roofing, such as treated felt and the like.

The primary object of the invention is to provide a new and novel apparatus for cutting shingles from a continuous strip of prepared roofing, such as treated felt and the like.

Another object is to provide an apparatus of improved design for cutting a continuous strip into a plurality of strips, in accordance with a predetermined design, which will cut the plurality of strips to provide individual shingles of the exact same size, and which will discharge the severed shingles along divergent paths and stack them in separate piles.

Another object is to provide an apparatus which will sever a relatively wide strip of asphalt roofing material to form a plurality of strips, which will cut each of the strips along a vari-directional line to provide complementary strips, which will cut the complementary strips transversely along the staggered lines of severance to provide shingles of the same contour and size, and which will discharge the cut shingles into a plurality of separate stacks.

A further object is to provide an apparatus for making asphalt shingles, which has a cutter head engaging a reactive platen or roller, the roller being of a different diameter than the cutter head, so that the knives or blades of the cutter head will engage a different surface on the roller on each revolution of the cutter head to prevent the knives from coming in contact with the roller at the same place.

Numerous other objects and advantages will be apparent throughout the progress of the following specification.

The invention comprises in general a machine having a bed, over which a continuous roll of asphalt roofing material is fed under tension. The strip of material is cut by a splitting knife, which is operated through a chain of gears. Forming rollers or cutter heads are arranged above the bed of the machine, and they are provided with a plurality of knives for cutting the split material along vari-directional lines to provide individual complementary strips. A reactive platen or roller is arranged below the cutter heads and is of a different diameter than the cutter head. The roller rotates with the cutter heads but in a reverse direction, the strips of material being fed between the cutter heads and the roller to assist in feeding the strips. As the roller is of a different diameter than the cutter heads, the blades arranged in the cutter heads will not contact with the roller at the exact same position on the roller during successive revolution of the cutter heads. The complementary strips are then fed to an end cutter which cuts the strips transversely into separate shingles, the cutting operation of the strips being staggered. Means are provided for carrying the cut shingles to divergent paths, where they are stacked in separate piles.

The accompanying drawings illustrate a selected embodiment of the invention, and the views therein are as follows:

Fig. 1 is a detail sectional view of the improved apparatus.

Fig. 2 is a top plan view thereof.

Fig. 3 is a detail sectional view on the line 3—3 of Fig. 2 showing the manner in which the blades are arranged in the cutter head and the manner in which a cutter head meshes with a lower reactive platen or roller.

Fig. 4 is a plan view of a strip of roofing material showing the manner in which it is cut to provide separate shingles.

Fig. 5 is a diagrammatic view showing the manner in which the shingles are stacked.

Fig. 6 is a detail perspective view of a cut strip of material showing the several shingles starting on their delivery paths.

The apparatus, as shown in the accompanying drawings, comprises a suitable supporting frame 2 having a bracket 4 attached thereto, which carries a roll of asphalt roofing material or treated felt 6. This material is preferably in the form of a continuous strip, and is fed through a plurality of opposed feed rolls 8 which are mounted on top of the supporting frame 2. These feed rolls are driven by means of a chain of intermeshing gears 10 which are located at the side of the frame 2, and are operated from a source of a belt driven power 12.

A slitter 14 is mounted on a transverse shaft 16 which is rotated by means of a gear 18 meshing with a gear of the chain of gears 10. The slitter is arranged between the front feed rolls 8 and the roll of roofing material 6 to slit the strip of material along the line 19, forming two separate smaller strips. Cutter heads 20 and 22 are keyed to a transverse shaft 24 and rotate therewith. This shaft is suitably mounted on the frame 2 and is provided with a gear which has meshing relation with the chain of gears 10 for rotating the shaft. A set screw 26 threadedly engages a collar 27 which is connected to each cutter head 20 and 22 to prevent sliding movement of the cutter heads on the shaft 24 during the cutting operation.

A plurality of blades or knives 30 are adjustably and detachably fastened to the heads 20 and 22 to sever each of the strips 31 and 32 along the vari-directional lines 33 to divide these strips 31 and 32 into complementary strips 34 and 35 respectively. The blades are arranged in the heads to design cut the strips in any desired formation. In the present embodiment, the edges of the strips are provided with approximately zig-zag cuts substantially in the form of truncated angles. The cutter heads are arranged to cut each strip 31 and 32 simultaneously and form the edges of the strips 34 and 35 with the illustrated design 36. This design is a substantially zig-zag line with the points cut off and the valleys partly filled up, the projections and depressions alternating, the projections of one strip filling the valleys or depressions of the other complementary strip. The particular design of the edges 36 may be curved or of any other design desired. While the term "zig-zag" is used throughout the specification, it is to be understood that this term includes any equivalent design.

A reactive platen or roller 62 is revolvably mounted on the frame 2 and is located below the cutter heads 20 and 22 and has contacting relation therewith. The strip of treated felt or roofing material passes between the cutter heads and the roller 62 and assists in feeding the strip along. The roller forms a surface for the cutting blades as they rotate and cut the traveling strip of felt. The cutter head 22 is geared to the roller 62 to rotate the same, and as gears on the rollers are not in proportion with the rollers themselves, one roller will rotate at a slightly different speed than the other and consequently a fresh surface is constantly presented to the cutting blades during successive roation of the cutter heads. In other words, the pitch line 64 of the intermeshing gears 66 and 68 of the drum and roll are so arranged either above or below the circumferential line 60 so that the cutters will travel at a greater speed than the other roll to form a shearing cut. If the gears on the rollers were in proportion to the size of the rollers themselves then, of course, the rollers would travel at the same linear speed. However, in the present embodiment it is preferred that the gears on the drum and roll are not in proportion to the size of the drum and roll themselves. Therefore, one of these two members will rotate at a slightly different speed than the other. The particular construction of the cutter heads and the manner in which the knives are adjustably and detachably fastened to the cutter heads is disclosed and claimed in a co-pending divisional application, Serial No. 259,770, filed March 7, 1928.

After the two strips 34 and the two strips 35 have passed the cutter heads 20 and 22 in their passage through the machine, they are cut into a succession of separate shingles 63 by means of end cutters. These end cutters are mounted on a cross-shaft 70 and driven from the gears 72. The cutters comprise four blades arranged across the width of the machine, one for each of the strips. These blades are mounted on rotary arms 74 and are staggered across the machine so as to operate in succession on the adjacent strips. This staggered arrangement of the end cutter blades cuts each complemental strip transversely along the lines 75 at the point where the interlocking or complemental projections and cut-outs are arranged in staggered relation longitudinally of the felt strip.

A plurality of belt conveyers 76, 78, 80 and 82 are mounted on a cross-shaft 84 and driven by suitable gears from a source of power at a speed greater than the speed of the felt strip, so that the shingles when they are cut from the strips are accelerated. A presser roll 86 is arranged over each of the conveyer belts and mounted on a bracket 90, so that the weight of the presser roll bears directly on the traveling conveyer belt and impinges the strip therebetween to provide tension on the strip as it is being cut by one of the end cutter blades. A reactive roll 87 is provided for each pressure roll and is disposed beneath each belt, as clearly shown in Fig. 1. The distance between the presser rolls and the end cutters is such that when the free ends of the felt strips feed forward and engage the conveyer belt, they will be carried along thereby until they pass under the presser roll 86, where they will be gripped. Since the speed of the conveyer belt is faster than the strip feed, the strips will be pulled taut or tensioned to remove all wrinkles and buckles therefrom. At this time the end cutter operates to sever the exact length of the strip to form a shingle. Each end cutter operates in the same manner, so that a succession of shingles is formed from each of the four strips and all the shingles are identical. The position of the presser rolls may be adjusted toward and away from the cutter, if desired.

The conveyer belts are arranged to complete the severance of any incompletely cut strips. The successive belts are arranged in divergent paths, Fig. 2, whereby the adjacent strips are shifted laterally and separated. These belts are arranged so that they diverge into different planes disposed horizontally of the machine, and permit the successive shingles of adjacent strips to be facilely stacked with their ends coterminous.

Due to the locking of the alternate projections and depressions which extend longitudinally of the strip, the separate shingles may be moved along paths of equal length to stacking stations, if alternate strips are moved along lowered and raised paths, as shown in Fig. 6. In carrying out this arrangement, the first and third belts are inclined downwardly, leaving the second and fourth belts in the horizontal plane of the machine. The free ends of the downwardly inclined belts have their ends disposed adjacent the lower stacking rack, and the outer ends of the upper belts have their free ends adjacent the upper stacking racks. In this manner the successive shingles of adjacent strips can be carried to the stacks and piled, their ends coterminous without interruption and without increasing the length of the conveyer belts, as would be necessary if the belts were diverged laterally.

The invention provides an apparatus for forming cut shingles from a continuous strip of prepared roofing material, such as treated felt and the like. In the present device the single strip of felt passes continuously from a supply roll, fed along at a constant rate of speed and formed into a plurality of strips of identical design by means of a single slitter and a pair of design cutters. As the felt strip continues to travel, each of the strips is cut transversely into identical shingles of equal, exact length, which are quickly removed from the machine by means of an accelerated feed. The shingles are then stacked into neat piles, each having their ends coterminous. The apparatus is compact and durable and accomplishes the maximum number of operations with the minimum amount of machinery. The cutter heads are slidably mounted on a shaft, so that four strips of any desired but preferably equal size may be cut from a relatively wide roll of treated material, regardless of its width. The arrangement of the discharge belts provides complete severance of the shingles and permits them to be stacked in a compact form.

Changes may be made in the form, construction and arrangement of the parts without departing from the spirit of the invention or sacrificing any of the advantages thereof, and the right is hereby reserved to make all such changes as fairly fall within the scope of the following claims.

I claim:

1. The combination with an apparatus for forming shingles from a strip of roofing material comprising means for slitting the strip longitudinally to form smaller strips, and means for cutting the smaller strips longitudinally along vari-directional lines in accordance with a predetermined design and forming other strips having complementary projections and recesses, of means for cutting each of said last named strips singly and transversely into shingles of a predetermined size.

2. In an apparatus for forming shingles, the combination of means for feeding a strip of treated felt or the like, cutting means adapted to cut said strip longitudinally into smaller strips, means for cutting the smaller strips into a plurality of strips with edges cut to a predetermined design, end cutters for said strips adapted to cut off predetermined lengths from each of said last named strips to form shingles, and means for tensioning each of said strips prior to the end cutting operation to insure the accurate cutting of length from each of the last named strips.

3. In an apparatus for forming shingles, the combination of means for feeding a strip of roofing material, said means including a rotatable feed drum provided with a continuous series of demountable, radially adjustable cutting blades for forming a continuous line of cut in the strip as the drum rotates, a reactive feed roll for said cutter drum and between which and the cutter drum the strip is fed, and toothed gearing between said drum and the reactive feed roll, the gearing between the drum and roll being of slightly different proportion as regards the drum and roll themselves to force one of said members to travel at a slightly different speed than the other.

4. An apparatus for forming shingles from a strip of prepared roofing comprising a slitter for dividing the strip longitudinally into a plurality of strips, adjustable cutter heads for longitudinally cutting said plurality of strips into a plurality of other strips of a predetermined variable width, end cutters for cutting a shingle from each of said strips at different times and at regular sequence, and means for accelerating the cut shingles from the end cutters of said apparatus along diverging paths.

5. An apparatus for making shingles from a strip of prepared roofing comprising a slitter for cutting said strip longitudinally into a plurality of narrower strips, a rotary cutter member for continuously cutting said narrower strips longitudinally along vari-directional lines to provide other strips having complementary flanges and recesses, and a rotary end cutter for cutting each of said last named strips transversely at different times but in regular sequence.

In witness whereof, I have hereunto subscribed my name.

HENRY C. KOCH.